US012749049B2

(12) United States Patent
Choi

(10) Patent No.: US 12,749,049 B2
(45) Date of Patent: Sep. 29, 2026

(54) APPARATUS AND METHOD FOR PROCESSING WORK ACTIVITY BASED ON WORK OBJECT

(71) Applicants: DELTA PDS CO., LTD., Seoul (KR); Jae Ho Choi, Seoul (KR)

(72) Inventor: Jae Ho Choi, Seoul (KR)

(73) Assignees: DELTA PDS CO., LTD., Seoul (KR); Jae Ho Choi, Seoul (KR)

( * ) Notice: Subject to any disclaimer, the term of this patent is extended or adjusted under 35 U.S.C. 154(b) by 0 days.

(21) Appl. No.: 18/531,190

(22) Filed: Dec. 6, 2023

(65) Prior Publication Data

US 2024/0104504 A1 Mar. 28, 2024

Related U.S. Application Data

(63) Continuation of application No. 15/646,405, filed on Jul. 11, 2017, now abandoned.

(30) Foreign Application Priority Data

Jan. 13, 2017 (KR) ........................ 10-2017-0006035

(51) Int. Cl.
*G06Q 10/10* (2023.01)
*H04L 12/18* (2006.01)
(Continued)

(52) U.S. Cl.
CPC ......... *G06Q 10/103* (2013.01); *H04L 51/046* (2013.01); *H04L 12/1813* (2013.01); *H04L 12/1818* (2013.01); *H04L 51/216* (2022.05)

(58) Field of Classification Search
CPC ............... G06Q 10/103; G06Q 10/101; G06Q 10/063114; G06Q 10/06316;
(Continued)

(56) References Cited

U.S. PATENT DOCUMENTS 7,155,435 B1 * 12/2006 Day ................. G06Q 10/06311 707/999.102
8,738,414 B1 5/2014 Nagar et al.
(Continued)

FOREIGN PATENT DOCUMENTS

JP H11-143936 A 5/1999
JP 2004-013267 A 1/2004
(Continued)

OTHER PUBLICATIONS

B. Ionescu, C. Gadea, B. Solomon, M. Trifan, D. Ionescu and V. Stoicu-Tivadar, "A chat-centric collaborative environment for web-based real-time collaboration," 2015, 2015 IEEE 10th Jubilee International Symposium on Applied Computational Intelligence and Informatics, Timisoara, Romania, pp. 105-110, (Year: 2015).*
(Continued)

*Primary Examiner* — Sarah M Monfeldt
*Assistant Examiner* — Michael J. Monaghan
(74) *Attorney, Agent, or Firm* — Paratus Law Group, PLLC

(57) ABSTRACT

A work activity processing apparatus based on a work object, includes: a memory unit comprising a work activity map memory area related to at least one member and containing at least one work activity, and a chat room memory area related to the work activity map and related to a chat room implemented through a message thread; and a circuitry configured to generate a work activity object, which indicates a work activity related to the chat room, by associating the chat room with a work activity comprising work activity contents or multimedia attached file, create, in the chat room, a work object related to the work activity object and comprising a work generator, a work processor, and work contents, and add the work object as a work message to the message thread related to the chat room to
(Continued)

update the message thread and then update the work activity map.

13 Claims, 10 Drawing Sheets

(51) Int. Cl.
*H04L 51/046* (2022.01)
*H04L 51/216* (2022.01)

(58) Field of Classification Search
CPC .... G06Q 10/0633; G06Q 10/10; G06Q 10/06; G06Q 10/06311; G06Q 10/0631; G06Q 10/04; H04L 51/046; H04L 12/1813; H04L 12/1818; H04L 51/216; H04L 51/04; H04L 51/21; H04L 51/234; H04L 65/403
See application file for complete search history.

(56) References Cited

U.S. PATENT DOCUMENTS

| | | | | |
|---|---|---|---|---|
| 9,886,664 | B2 | 2/2018 | Dhara et al. | |
| 2003/0088623 | A1* | 5/2003 | Kusuda | H04L 51/04 709/204 |
| 2005/0193062 | A1* | 9/2005 | Komine | G06Q 10/10 709/204 |
| 2006/0053194 | A1* | 3/2006 | Schneider | H04L 12/1827 709/204 |
| 2006/0053380 | A1* | 3/2006 | Spataro | G06Q 10/10 709/204 |
| 2009/0319608 | A1* | 12/2009 | Anil | G06Q 10/06 709/204 |
| 2010/0070881 | A1 | 3/2010 | Hanson et al. | |
| 2010/0250322 | A1 | 9/2010 | Norwood | |
| 2012/0042003 | A1 | 2/2012 | Goetz et al. | |
| 2012/0192086 | A1 | 7/2012 | Ghods et al. | |
| 2013/0024452 | A1* | 1/2013 | Defusco | G06F 16/2428 707/E17.089 |
| 2013/0046828 | A1* | 2/2013 | Grewal | G06Q 10/10 709/204 |
| 2013/0080919 | A1 | 3/2013 | Kiang et al. | |
| 2013/0179799 | A1 | 7/2013 | Savage | |
| 2013/0198304 | A1 | 8/2013 | Jung | |
| 2014/0089822 | A1* | 3/2014 | Wu | G06F 3/04817 715/761 |
| 2014/0101571 | A1* | 4/2014 | Lewis | H04L 67/1044 715/753 |
| 2014/0137003 | A1 | 5/2014 | Peters et al. | |
| 2014/0208325 | A1 | 7/2014 | Chen et al. | |
| 2014/0298207 | A1 | 10/2014 | Ittah et al. | |
| 2014/0372536 | A1* | 12/2014 | Ahlgren | G06Q 10/10 709/205 |
| 2015/0082198 | A1 | 3/2015 | Destagnol et al. | |
| 2015/0100503 | A1 | 4/2015 | Lobo et al. | |
| 2015/0112749 | A1 | 4/2015 | Erdal | |
| 2015/0317073 | A1 | 11/2015 | Hull et al. | |
| 2015/0324899 | A1 | 11/2015 | Starikova et al. | |
| 2016/0072841 | A1* | 3/2016 | Caporal | G06F 3/04845 726/1 |
| 2016/0189104 | A1 | 6/2016 | Defusco et al. | |
| 2016/0224939 | A1* | 8/2016 | Chen | G06Q 10/107 |
| 2016/0342571 | A1 | 11/2016 | Lane et al. | |
| 2016/0344679 | A1* | 11/2016 | Lane | H04L 51/214 |
| 2017/0041435 | A1* | 2/2017 | Simpson | H04L 43/0817 |
| 2017/0090687 | A1 | 3/2017 | Ali et al. | |
| 2017/0093874 | A1 | 3/2017 | Uthe | |
| 2017/0134316 | A1* | 5/2017 | Cohen | H04L 51/216 |
| 2017/0206501 | A1 | 7/2017 | Wang | |
| 2017/0330120 | A1 | 11/2017 | Zhang et al. | |
| 2017/0364866 | A1* | 12/2017 | Steplyk | G06Q 10/063114 |
| 2018/0095938 | A1 | 4/2018 | Monte | |
| 2018/0095940 | A1* | 4/2018 | Meixner | H04L 51/046 |
| 2018/0152407 | A1 | 5/2018 | Soni | |
| 2018/0173794 | A1* | 6/2018 | Aikawa | G06F 21/50 |
| 2018/0189706 | A1 | 7/2018 | Newhouse et al. | |
| 2018/0189735 | A1 | 7/2018 | Lo et al. | |

FOREIGN PATENT DOCUMENTS

| | | | |
|---|---|---|---|
| JP | 2004-310273 | A | 11/2004 |
| JP | 2013-191013 | A | 9/2013 |
| KR | 10-2005-0092173 | A | 9/2005 |
| KR | 10-0663494 | B1 | 1/2007 |
| KR | 10-2013-0073341 | A | 7/2013 |

OTHER PUBLICATIONS

Korean Office Action for related KR application No. 10-2017-0006035 mailed Nov. 24, 2017 from Korean Patent Office.
Japanese Office Action for related JP application No. 2017-135802 mailed Oct. 9, 2018 from Japanese Patent Office.

* cited by examiner

500

APPARATUS AND METHOD FOR PROCESSING WORK ACTIVITY BASED ON WORK OBJECT

CROSS REFERENCE TO PRIOR APPLICATIONS

This application is a Continuation application of U.S. patent application Ser. No. 15/646,405 (filed on Jul. 11, 2017), which claims priority to Korean Patent Application No. 10-2017-0006035 (filed on Jan. 13, 2017), which are all hereby incorporated by reference in their entirety.

BACKGROUND

The present invention relates to work activity processing technology, and more particularly, to an apparatus and method for processing a work object based work activity that can efficiently process a work activity through a work activity map.

An Internet messenger is an application that transmits a message including a character or graphic to users and may be implemented into a chat room in which a plurality of users participate. In an exemplary embodiment, the Internet messenger may include a mobile messenger to be performed in a mobile environment (e.g., a mobile phone) and may include, for example, Kakaotalk, line, WeChat, and Facebook messengers.

In order to transmit a user intention to another party through a message, the Internet messenger may notify a user whether another party reads a message and a participation state of another party in a chat room. While the number of users using the Internet messenger rapidly increases, applications using in a mobile environment have been very variously developed, and a work processing program among them have been used by many users.

Korean Patent Laid-Open Publication No. 10-2005-0092173 relates to a method of inputting data for performing a work and a method of displaying a screen in a mobile device and disclosures technology that displays a date or a to-do list in a row or a column in a table form; when any one date is selected, to-do corresponding to the date are displayed in a box form, the left side end and the right side end of the box become a start day and a termination day of the to-do, and when a box of the start day and the termination day is not displayed on a screen, the patent application disclosures technology that displays information about the start day and the termination day at end boxes of the left side and the right side displayed on the screen and that displays information about corresponding to-do at the inside of the box and that outputs a selection window including completion of the to-do, delay of the to-do, termination of the to-do, and execution of the to-do such that a user may manipulate contents of the corresponding to-do stored on a date basis.

Korean Patent No. 10-0663494 relates to a method of managing to-do using a mobile communication terminal and discloses technology that determines whether a to-do item has arrived at a predetermined time and that determines a non-complete to-do item among previously registered to-do items, if a to-do item has arrived at the predetermined time and that displays the non-complete to-do item according to the determination result.

PRIOR ART DOCUMENT

Patent Document (Patent document 1) Korean Patent Laid-Open Publication No. 10-2005-0092173 (laid-open on Sep. 21, 2005)

(Patent document 2) Korean Patent No. 10-0663494 (registered on Dec. 22, 2006)

SUMMARY

The present invention has been made in view of the above problems and provides an apparatus and method for processing a work object based work activity that can efficiently process a work activity through a work activity map.

The present invention further provides an apparatus and method for processing a work object based work activity that can improve a teamwork with inducement of a rapid interaction.

In accordance with an aspect of the present invention, a work activity processing apparatus based on a work object includes: a memory unit including a work activity map memory area related to at least one member and related to a work activity map including at least one work activity and a chat room memory area related to the work activity map and related to a chat room implemented through a message thread; a work activity map processor that determines whether to generate a chat room for communication within the work activity map for the work activity, when the work activity is received from a first member and that relates the message thread to update the work activity map, if a chat room is generated; and a work object processor that receives a work object through the received work activity from a second member to update the message thread or that receives the work object from the second member through participation in the chat room to update the message thread.

The memory unit may further include a user memory area related to user information and a work object memory area related to the work object related to the chat room.

The work activity map processor may align at least one work activity included in the work activity map in most recently update order to display the at least one work activity at a specific portion of the work activity map.

The work activity map processor may align at least one chat room in most recently update order to display the at least one chat room at another specific portion of the work activity map, when the at least one chat room related to the work activity map is generated.

The work object processor may generate a reminder work object set satisfying a reminder condition among the work objects to display the reminder work object set at another specific portion of the work activity map.

The work object processor may generate a reminder message including reminder contents and the reminder number of a reminder work object at the reminder work object set to transmit the reminder message to at least one of a work processor and a work generator related to the reminder work object and a work reference person determined according to whether participation in a chat room related to the reminder work object.

The work object processor may calculate a response level of a work processor related to the work object on an execution state basis of the work object.

The work activity map processor may generate a sub-work activity map to relate the sub-work activity map to at least a portion of the at least one member and store the sub-work activity map at the work activity map memory area, when generation of the sub-work activity map related to at least a portion of at least one member related to the corresponding work activity map is requested through the work activity map.

The work activity map processor may enable the second member to enter the chat room through the received work activity or may enable the second member to enter the chat room through a link to the chat room provided to the work activity map.

The work object processor may receive an interaction of a work object received from a third member or a work activity received through the chat room to update the work object.

The work activity maps each may be intrinsically assigned to each user in the user information and be related to at least one member including the intrinsically assigned user.

The work activity map processor may provide a work activity map link that can enter each of work activity maps intrinsically assigned to each of members related to the work activity map through the work activity map.

In accordance with another aspect of the present invention, a method of processing a work object based work activity performed by a work activity processing apparatus based on a work object including a work activity map memory area related to at least one member and related to a work activity map including at least one work activity and a chat room memory area related to the work activity map and related to a chat room implemented through a message thread includes: a work activity map processing step of determining whether to generate a chat room for communication within the work activity map for the work activity, when the work activity is received from a first member and relating the message thread to update the work activity map, if a chat room is generated; and a work object processing step of receiving a work object through the received work activity from a second member and updating the message thread or receiving the work object from the second member through participation in the chat room and updating the message thread.

In accordance with another aspect of the present invention, a recording medium records a method of processing a work object based work activity performed by a work activity processing apparatus based on a work object including a work activity map memory area related to at least one member and related to a work activity map including at least one work activity and a chat room memory area related to the work activity map and related to a chat room implemented through a message thread. The work object based work activity processing method includes: a work activity map processing step of determining whether to generate a chat room for communication within the work activity map for a work activity, when the work activity is received from a first member and relating the message thread to update the work activity map, if a chat room is generated; and a work object processing step of receiving a work object through the received work activity from a second member and updating the message thread or receiving the work object from the second member through participation in the chat room and updating the message thread.

DETAILED DESCRIPTION

Figure 1:
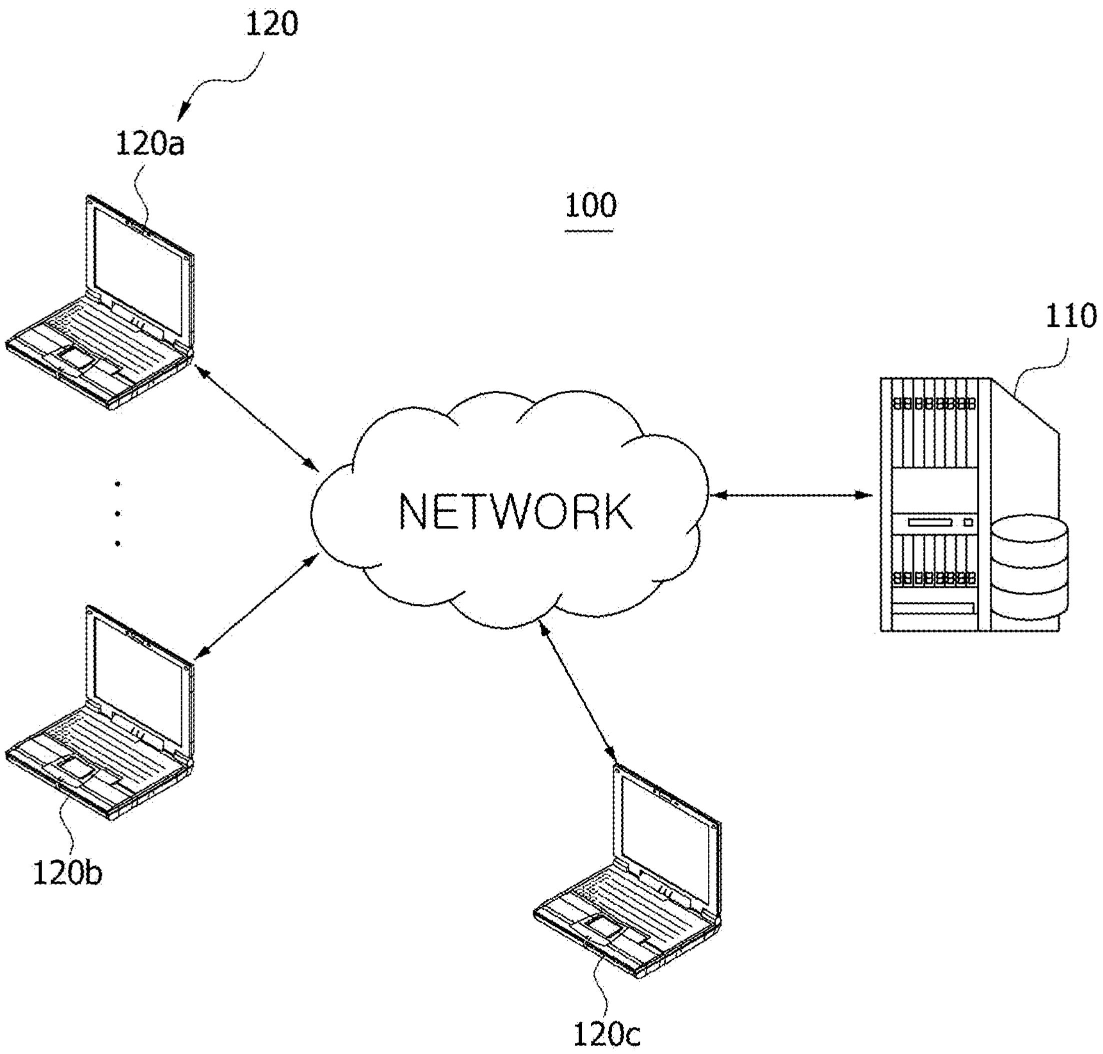
FIG. 1 is a diagram illustrating a work activity processing system according to an exemplary embodiment of the present invention.

A description of the present invention is merely an exemplary embodiment for a structural or functional description of the present invention and thus it should not be analyzed that the scope of the present invention is limited by an exemplary embodiment described in a detailed description. That is, because an exemplary embodiment may be variously changed and have several forms, it should be understood that the scope of the present invention include equivalents that can realize the spirit thereof. Further, it does not mean that a specific exemplary embodiment should include the entire following objects or effects or should include only the following effects and thus it should not be understood that the scope of the present invention is limited thereto.

A meaning of terms described in an exemplary embodiment of the present invention should be understood as follows.

A term such as "first" and "second" is used for distinguishing an element from another element and the scope of the present invention is not limited by the terms. For example, a first element may be referred to as a second element and similarly, a second element may be referred to as a first element.

When it is described that an element is "connected" or "electrically connected" to another element, the element may be "directly connected" or "directly electrically connected" to the other elements or may be 'connected" or "electrically connected" to the other elements through a third element. However, when it is described that an element is "directly connected" or "directly electrically connected" to another element, no element may exist between the element and the other element. Other expressions, i.e., "between" and "immediately between" or "adjacent to" and "directly adjacent to" describing a relationship between elements should be similarly analyzed.

Singular forms used here include a plurality of forms unless phrases explicitly represent an opposite meaning, and a term of "comprising" or "having" used in a specification embodies a characteristic, number, step, operation, element, component, or combination thereof and does not exclude presence or addition of another characteristic, number, step, operation, element, component, or combination thereof.

In each step, identification symbols (e.g., a, b, and c) are used for convenience of description and do not describe order of each step, and unless each step does not clearly describe specific order in a context, each step may occur differently from listed order. That is, each step may occur in the same order as listed order, may be substantially simultaneously performed, and may be performed in opposite order.

The present invention may be implemented with a computer readable code in a computer readable recording medium, and the computer readable recording medium includes an entire kind of record device that stores data that can be read by a computer system. The computer readable recording medium may include, for example a read-only memory (ROM), a random-access memory (RAM), a compact disc read-only memory (CD-ROM), a magnetic tape, a floppy disk, and an optical data storage device.

Unless differently defined, entire terms used here have the same meaning as a meaning that may be generally understood by a person of common skill in the art. It should be analyzed that terms defined in a generally using dictionary have a meaning corresponding with that of a context of related technology and are not analyzed as an ideal or excessively formal meaning unless explicitly defined in the present invention.

FIG. 1 is a diagram illustrating a work activity processing system according to an exemplary embodiment of the present invention.

Referring to FIG. 1, a work activity processing system 100 includes a work object based work activity processing apparatus 110 and a user terminal 120, and the work object based work activity processing apparatus 110 and the user terminal 120 may be connected through a network.

The work object based work activity processing apparatus 110 corresponds to a computing device that may be connected to the user terminal 120. In an exemplary embodiment, the work object based work activity processing apparatus 110 may efficiently process a work activity through a work activity map 320.

The user terminal 120 corresponds to a computing device connected to the work object based work activity processing apparatus 110 and may be implemented into, for example, a desktop computer, a notebook computer, a tablet PC, or a smart phone. In an exemplary embodiment, a first user terminal 120*a* may correspond to a mobile terminal and may be connected to the work object based work activity processing apparatus 110 through cellular communication or WiFi communication. In another exemplary embodiment, a second user terminal 120*b* may correspond to a desktop computer and may be connected to the work object based work activity processing apparatus 110 through Internet.

Figure 2:
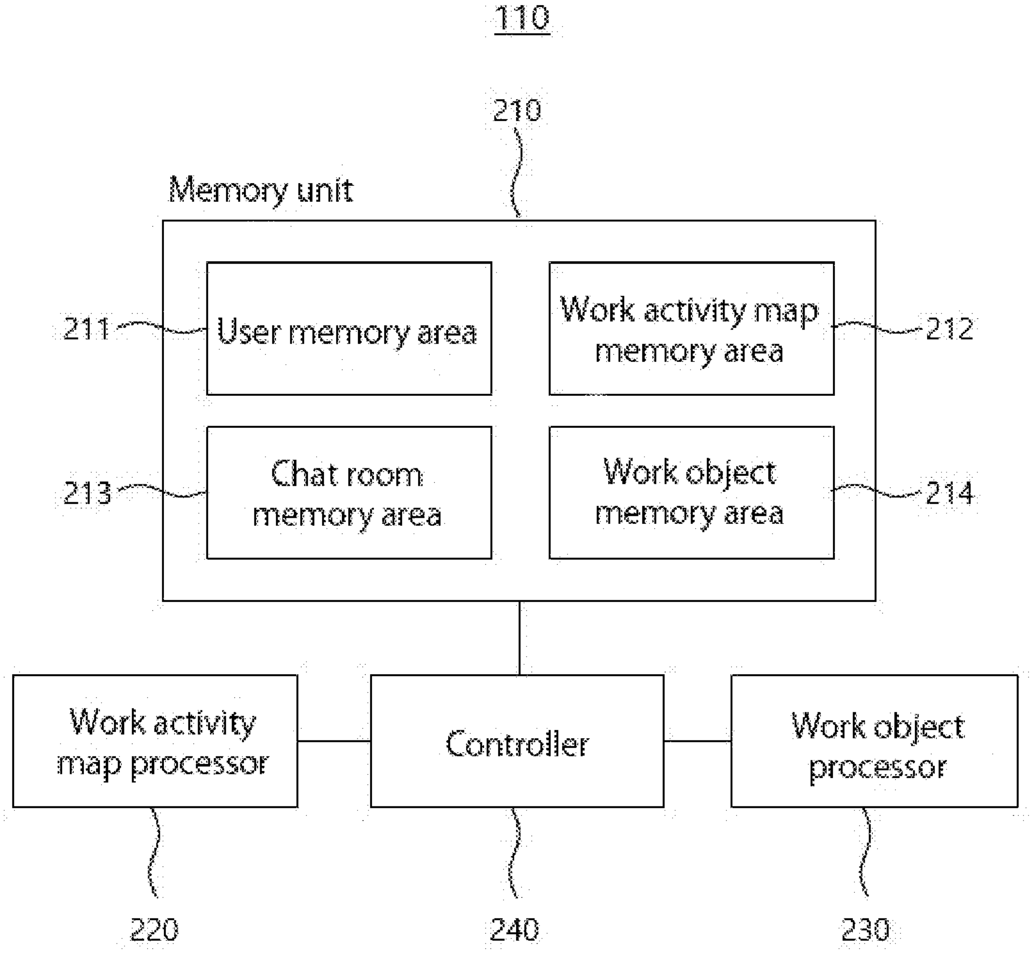
FIG. 2 is a block diagram illustrating a work object based work activity processing apparatus of FIG. 1.

FIG. 2 is a block diagram illustrating a work object based work activity processing apparatus of FIG. 1.

Referring to FIG. 2, the work object based work activity processing apparatus 110 may include a memory unit 210, a work activity map processor 220, a work object processor 230, and a controller 240, and the memory unit 210, the work activity map processor 220, the work object processor 230, and the controller 240 may be connected.

The memory unit 210 may store data used in an entire operation of the work object based work activity processing apparatus 110 and include a user memory area 211, a work activity map memory area 212, a chat room memory area 213, and a work object memory area 214. Such memory areas 211-214 may be implemented into a nonvolatile memory and may be connected through a hyperlink. Such contents will be described with reference to FIG. 3.

Figure 3:
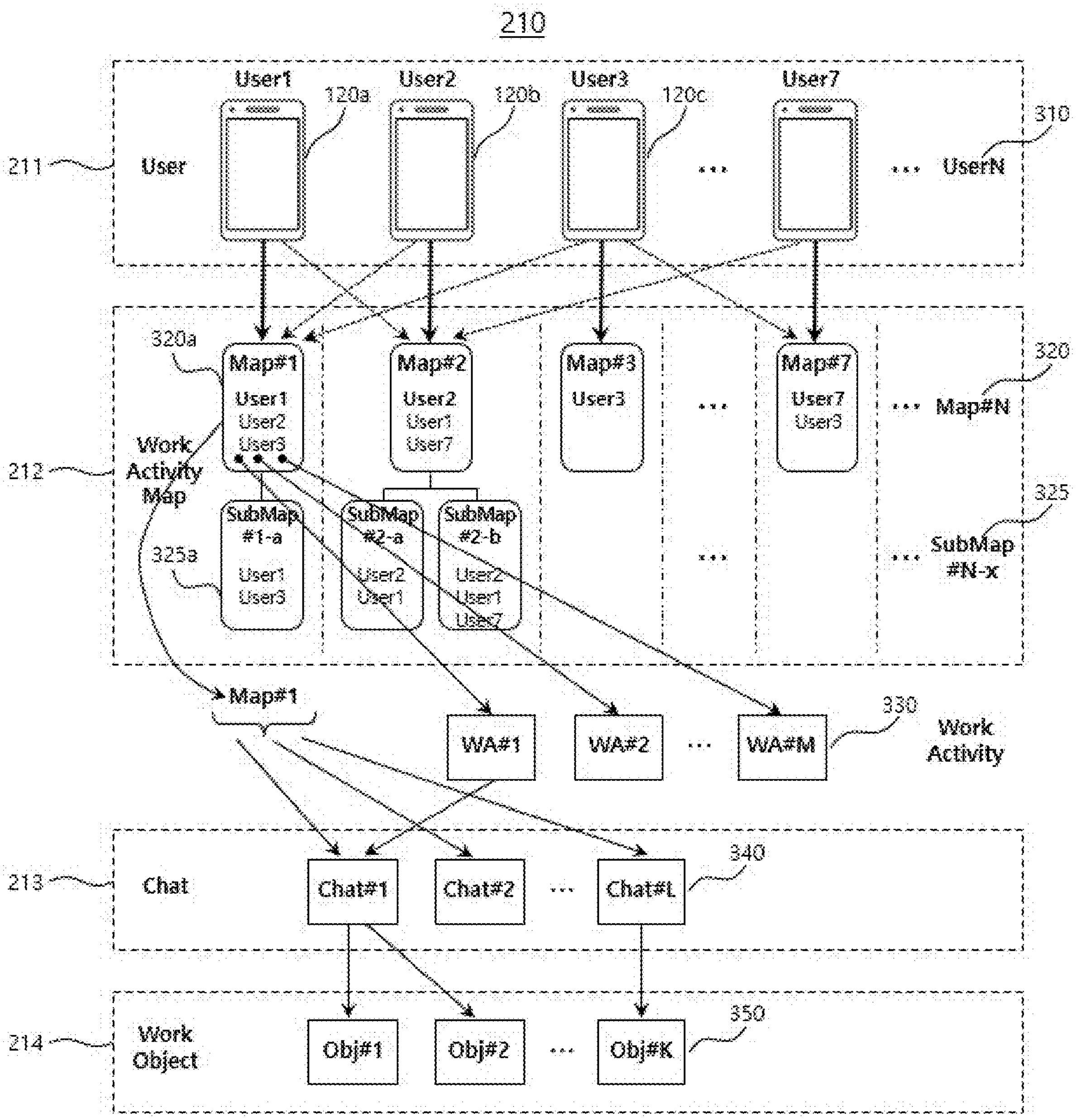
FIG. 3 is a diagram illustrating a material structure of a memory unit of FIG. 2.

FIG. 3 is a diagram illustrating a material structure of the memory unit 210 of FIG. 2.

The user memory area 211 is related to user information 310. In an exemplary embodiment, the user information 310 may include at least one of a user name (conversation name), a messenger ID, a password, and work activity map information related to a user.

The work activity map memory area 212 is related to a work activity map 320 related to at least one member. For example, at the work activity map memory area 212, a Work Activity Map #1 320*a* in which User1, User2, and User3 are related as a member may be stored. In an exemplary embodiment, the work activity maps 320 each may be intrinsically assigned to each user in the user information 310 and may be related to at least one member including the intrinsically assigned user. For example, the work activity map Map #1 320*a* may be intrinsically assign to the User1 and may be related to members including the User1, the User2, and the User3. Here, the work activity map 320 may include at least one of a work activity map name, at least one user related as a member, related chat room information, and work appraisal point information on a corresponding member basis. For example, a friend list and work appraisal point information related on a user basis may be stored and managed at the work activity map memory area 212 in a unit of the work activity map 320. The work activity map memory area 212 may be accessed through the user information 310.

The work activity map memory area 212 is related to the work activity map 320 including at least one work activity 330. For example, User1, User2, and User3 as a member are related to the work activity map Map #1 320*a*, and the work activity map Map #1 320*a* may include Work Activities WA #1, WA #2, . . . , WA #M. Here, the work activity 330 is a business log of a work activity, includes at least one of a writer, a written date, work activity contents, an execution date, and an attached file, and may include, for example only a multimedia attached file such as a picture without work activity contents. In an exemplary embodiment, the work activity 330 may be related to a specific chat room 340 according to a user request.

In an exemplary embodiment, the work activity map memory area 212 may be further related to a sub-work activity map 325 related to at least a portion of at least one member related to the work activity map 320 in addition to the work activity map 320. More specifically, the work activity map 320 is singly assigned to each user and is related to at least one member including a user, but the sub-work activity map 325 may be additionally assigned to the user and is related to at least a portion (entire or a portion) of all members related to the work activity map 320. For example, the work activity map Map #1 320*a* is intrinsically assigned to the User1 and is related to members including User1, User2, and User3, but the sub-work activity map SubMap #1-a 325*a* may be additionally assigned to the User1 according to a request of the User1 and is related to the User1 and the User3 corresponding to at least a portion of all members User1, User2, and User3 related to the work activity map Map #1 320*a*. In an exemplary embodiment, the sub-work activity maps 325 each may include at least one work activity 330, may be related to a specific chat room 340 according to a user request, and may include at least one of a sub-work activity map name, an intrinsically assigned user, a user related as a member, related chat room information, and work appraisal point information on a corresponding member basis.

The chat room memory area 213 is related to the chat room 340. Here, the chat room 340 is related to the work activity map 320 and is implemented through a message thread. The message thread is a group of transmitted messages between related members in a unit of the work activity map 320 or the sub-work activity map 325, and in an exemplary embodiment, the message thread may be implemented into a chat room of an Internet messenger. In an exemplary embodiment, the chat room 340 is related to a specific work activity 330 according to a user request and thus at least one chat room 340 may be generated, and at least a portion of members related to the work activity map 320 or the sub-work activity map 325 may be related as a participant. The chat room memory area 213 may be accessed through the work activity map 320 or through the work activity 330.

The work object memory area 214 is related to a work object 350 related to the chat room 340. In an exemplary embodiment, when the work object 350 is received through a specific chat room 340, the work object 350 is related to the chat room 340, and when the work object 350 is received through the work activity 330, the work object memory area 214 may be related to the specific chat room 340 newly generated between the work processor and the work generator included in the work object 350, and in this case, the chat room 340 may be related to the work activity 330. Here, the work object 350 may include at least one of a work generator, a work processor, a work reference person, and work contents. For example, the work generator may instruct, request, or appraise a work to the work processor through the work object 350, the work processor may transmit an interaction of a work execution response and a work completion response through the work object 350, and the work reference person may receive a work execution situation of the work object 350 as a member participating in a chat room that receives the work object 350 or a member designated to the work reference person by the work generator or the work processor. The work object memory area 214 may be accessed through the chat room 340.

When the work activity 330 is received from a first member, the work activity map processor 220 determines whether to generate the chat room 340 for communication within the work activity map 320 for the work activity 330, and if the chat room 340 is generated, the work activity map processor 220 relates a message thread to update the work activity map 320. More specifically, the work activity map processor 220 may receive the work activity 330 from the first member through the work activity map 320, and the first member is one of at least one member related to the work activity map 320. In an exemplary embodiment, the work activity map processor 220 may receive a new work activity 330 from a user through a work activity generation button 530 of a work activity map interface 500 that visualizes the work activity map 320 in a messenger installed in the user terminal 120.

In an exemplary embodiment, when the work activity 330 is received, if a chat room generation request is received from a member related to the work activity map 320 through the work activity 330, the work activity map processor 220 may determine to generate a related chat room 340 to relate a message thread to the work activity 330, thereby updating the work activity map 320, and when a separate chat room generation request is not received, the work activity map processor 220 may determine not to generate a related chat room 340 and may update the work activity map 320 based on the received work activity 330 without relating a separate message thread to the received work activity 330. For example, in a messenger installed in the user terminal 120, when a chat room generation request is received from one of related members through a second chat room generation button 814 of a work activity interface 800, the work activity map processor 220 may determine to generate the chat room 340 related to the work activity 330.

Figure 5:
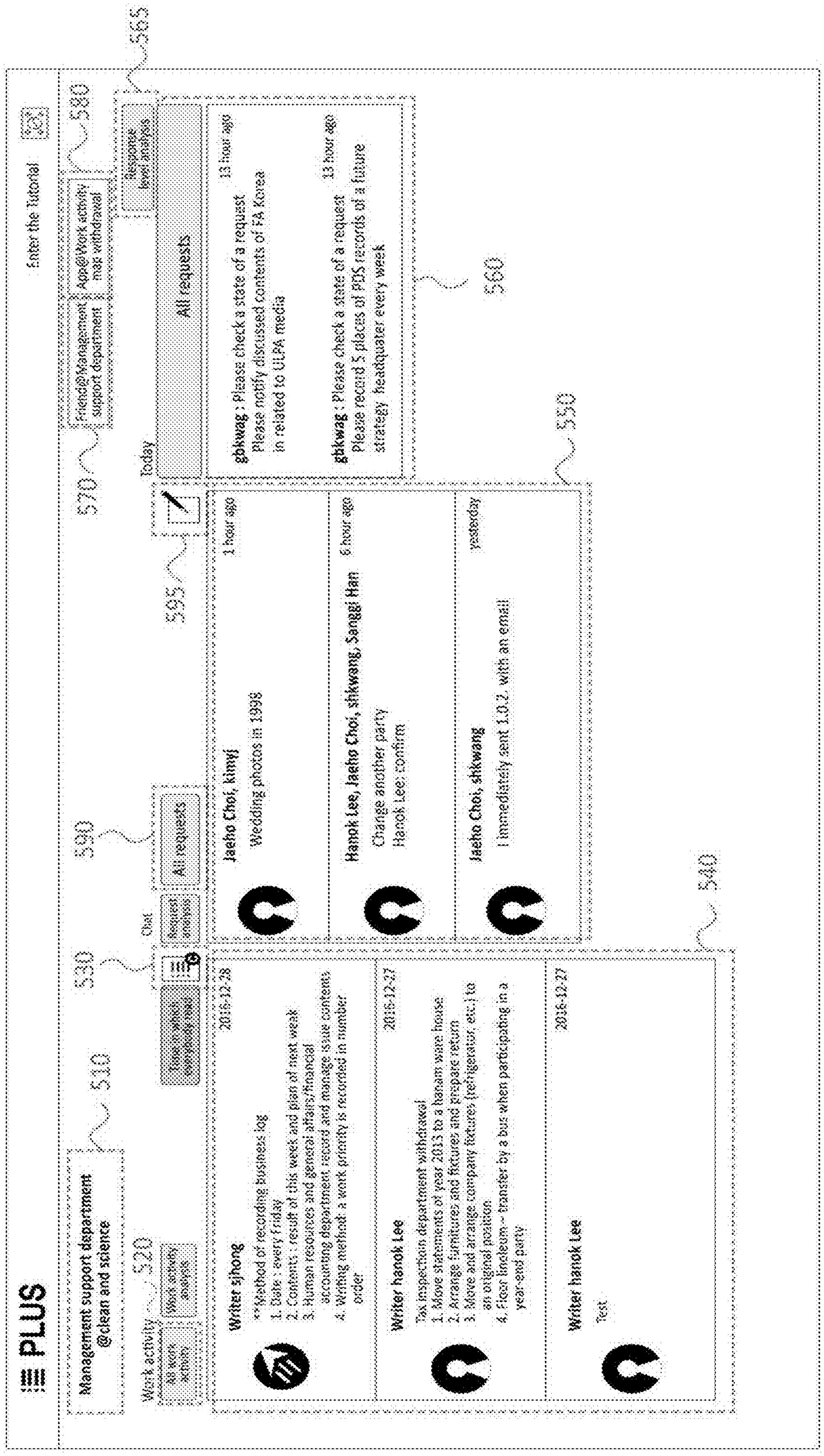
FIG. 5 is a diagram illustrating an exemplary embodiment of a process in which a work object based work activity processing apparatus of FIG. 1 provides a work activity map interface that visualizes a work activity map through a messenger installed in a user terminal.

The work activity map processor 220 may provide user information 310 related to the user terminal 120 and information about at least one of the work activity map 320 including the work activity 330, the chat room 340, and the work object 350 to the user terminal 120 and enable the user terminal 120 to display the work activity map 320 through a messenger installed in the user terminal 120, and in an exemplary embodiment, the work activity map processor 220 may provide the work activity map interface 500 that visualizes the work activity map 320 (see FIG. 5). In an exemplary embodiment, when the user terminal 120 requests access to the work activity map 320, the work activity map processor 220 may access the work activity map memory area 212 through the user information 310 related to the user terminal 120 to read information about the work activity map 320 assigned to the user information 310 and to provide the information to the user terminal 120, and the user terminal 120 may display the work activity map 320 through a messenger installed in the user terminal 120.

The work activity map processor 220 may align at least one work activity 330 included in the work activity map 320 in most recently update order to display the at least one work activity 330 in a specific portion of the work activity map 320. More specifically, in a process in which the user terminal 120 displays the work activity map 320 by providing information about the work activity map 320 including the work activity 330 related to the user terminal 120, the work activity map processor 220 may further visualize at least a portion of information about the work activity 330 included in the work activity map 320, and in a process in which the user terminal 120 displays the work activity map 320 by providing the work activity 330 including a written date (received date of the work activity 330) or a update date (update date of the work activity 330) to the user terminal 120, the work activity map processor 220 may align the work activities 330 in most recently update order (see a work activity list 540 of FIG. 5).

In an exemplary embodiment, the work activity map processor 220 may first consider importance of at least one work activity 330 included in the work activity map 320 and align the at least one work activity 330 in recently update order to display the at least one work activity 330 in a specific portion of the work activity map 320. For example, in a process in which the user terminal 120 displays the work activities 330 set as an activity having high importance on the work activity map 320 through a favorite button 813 of a messenger, the work activity map processor 220 may give a priority to the work activity 330 to align the work activity 330 at the top and may align other work activities 330 in most recently update order.

When at least one chat room 340 related to at least one work activity 330 included in the work activity map 320 is generated, the work activity map processor 220 may align at least one chat room 340 in most recently update order to display the at least one chat room 340 in another specific portion of the work activity map 320. For example, the work activity map processor 220 may enable the user terminal 120 to align and display the work activities 330 in most recently update order in a portion of the work activity map interface 500 and to align and display the chat rooms 340 in most recently update order in another portion of the work activity map interface 500 (see a chat room list 550 of FIG. 5).

When generation of the sub-work activity map 325 related to at least a portion of at least one member related to the work activity map 320 is requested through the work activity map 320, the work activity map processor 220 may generate the sub-work activity map 325 to relate the sub-work activity map 325 to at least a portion of at least one member and to store the sub-work activity map 325 at the work activity map memory area 212. In an exemplary embodiment, the work activity map processor 220 may receive a generation request of the sub-work activity map 325 related to at least a portion of members related to the work activity map 320 from a specific user to which the specific work activity map 320 is intrinsically assigned and thus the work activity map processor 220 may further assign the sub-work activity map 325 to a specific user to relate the sub-work activity map 325 to at least a portion of corresponding members. For example, the work activity map processor 220 may receive a generation request of the sub-work activity map 325*a* SubMap #1-a 325*a* in which User1 and User3 are related among all members User1, User2, and User3 related to a work activity map Map #1 320*a* from the User1 to which the work activity map Map #1 320*a* is intrinsically assigned through the work activity map Map #1 320*a* and additionally assign the sub-work activity map 325*a* to the User1 to relate the User1 and the User3. Accordingly, the User1 and the User3 may further use the sub-work activity map SubMap #1-a 325*a* in which only the User1 and the User3 among members participate in addition to the work activity map Map #1 320*a* in which all members participate.

In an exemplary embodiment, the work activity map processor 220 may give the authority of a generation request of the sub-work activity map 325 to at least one of at least one member who receive the authority of a manager according to a specific user to which the work activity map 320 is intrinsically assigned and a request of the specific user.

In an exemplary embodiment, when an invitation request for participating a second user in the specific work activity map 320 or the sub-work activity map 325 is received from a first user, the work activity map processor 220 may relate the second user to the work activity map 320 or the sub-work activity map 325 based on approval of the second user. Here, the first user and the second user are one of users in the user information 310, and the first user corresponds to a specific user to which the work activity map 320 is intrinsically assigned, and the second user corresponds to another specific user that is not related to the work activity map 320. The work activity map processor 220 may give the authority of an invitation request to at least one of the first user and at least one member who receives the authority of a manager according to a request of the first user, and in an exemplary embodiment, when an invitation request is received from a member having no authority of an invitation request, by transmitting the invitation request to a user having the authority of the invitation request, only when the invitation request is approved, the work activity map processor 220 may relate the second user to the work activity map 320 or the sub-work activity map 325.

In the foregoing exemplary embodiments, the work activity map processor 220 may receive an invitation request through a friend invitation button 570 of a messenger installed in the user terminal 120. Such contents will be described in detail in a detailed description of FIG. 5.

The work activity map processor 220 may provide a work activity map link that can enter each of the work activity map 320 intrinsically assigned to each of members related to the work activity map 320 through the work activity map 320. For example, in a process of displaying a work activity map Map #1 320*a* intrinsically assigned to the User 1 through the user terminal 120 related to the User1, the work activity map processor 220 may provide a work activity map link that can enter work activity maps Map #2 and Map #3 intrinsically assigned to each of User2 and User3 related to the work activity map Map #1 320*a* to the user terminal 120 to visualize a work activity map link in a portion of the work activity map interface 500 in which the user terminal 120 displays the work activity map Map #1 320*a*, and when an entrance request to the work activity map Map #2 among the work activity map links is received from the user terminal 120, by providing work activity map Map #2 information to the user terminal 120, the work activity map processor 220 may display the work activity map Map #2. In this case, when the User1 is not related as a member to the work activity map Map #2, the work activity map processor 220 does not allow that the user terminal 120 enters the work activity map Map #2 and does not provide the work activity map Map #2 information.

The work object processor 230 receives the work object 350 from the second member through the received work activity 330 (the work activity received from the first member) and updates a message thread or receives the work object 350 through participation in a chat room from the second member and updates a message thread. Here, the second member is one of members related to the work activity map 320 and may be the same member as the first member or may be a member different from the first member. Here, the work object 350 may include a work generator who requests a work, work contents and a work processor who performs a work and may further include at least one of a work deadline, whether a point is provided, and various contents related to work contents.

More specifically, the work object processor 230 may receive the work object 350 from the second member through the work activity 330 already received by the first member, a work processor and a work generator included in the received work object 350 are participating, and the work object processor 230 may determine whether to select one of at least one already generated chat room 340 or whether to newly generate a specific chat room 340 in which only the work processor and the work generator participate according to a user selection and add the work object 350 as a work message to an existing message thread related to the selected chat room 340 or to a new message thread generated by relating to the new chat room 340 to update the message thread.

The work object processor 230 may receive the work object 350 from the second member through the chat room 340 related to the work activity map 320, add the received work object 350 to a message thread related to the chat room as a work message to update the message thread and update the work activity map 320.

The work object processor 230 may generate a message thread represented in a messenger commonly used between the work generator and the work processor, and in an exemplary embodiment, the message thread may be represented in a pair of a work message and a conversation message in a messenger implemented through the user terminal 120. More specifically, the work object processor 230 may represent the work object 350 with a work message that can mutually interact a request for work execution by a work generator, a work determination response, and a work related response by a work processor and write a conversation related to work execution to represent the conversation with a conversation message. Further, whenever a current work execution state of the work object 350 is changed, the work object processor 230 may add the work object 350 as a work message to the related message thread to notify participants in a corresponding chat room.

In an exemplary embodiment, the work activity map processor 220 may enable the second member to enter the chat room 340 through the received work activity 330 (the work activity received from the first member) or through a link to the chat room 340 provided in the work activity map 320. More specifically, by providing the work activity 330 including a link that can enter the chat room 340 related to the user terminal 120, the work activity map processor 220 may enable the second member to enter the chat room 340 through a link in the work activity 330 or may enable the user terminal 120 to display the chat room 340 related to the work activity map 320 in a portion of the work activity map interface 500 that displays the work activity map 320 and provide a link that can immediately enter the chat room 340 to enter the chat room 340 through the link (see FIG. 5).

In an exemplary embodiment, when a combination request of the sub-work activity map 325 related to a member is received from the member related to the work activity map 320, the work activity map processor 220 may combine the sub-work activity map 325 to the work activity map 320 based on approval of a specific user to which the work activity map 320 is intrinsically assigned. For example, in relation to the work activity map Map #1 **320*a* intrinsically assigned to the User1 and in which User1, User2, and User3 are related as a member, when a combination request of the sub-work activity map SubMap #1-a 325*a* related to the User3 is received from the User3, the work activity map processor 220 may combine the sub-work activity map SubMap #1-a 325*a* into the work activity map Map #1 320*a* based on approval of the User1 and enable the work activity 330, the chat room 340, and the work object 350 included in the sub-work activity map SubMap #1-a 325*a* or related to the sub-work activity map SubMap #1-a 325*a* to be included in all work activities map Map #1 320*a* or to be related to all work activities map Map #1 320*a***.

The work object processor 230 may generate a reminder work object set satisfying a reminder condition among the work objects 350 to display the reminder work object set in another specific portion of the work activity map 320. More specifically, the work object processor 230 may determine whether reminder is required based on a work execution state and a deadline among at least one work object 350 related to the work activity map 320 to generate a reminder work object set of the work object 350 satisfying a reminder condition, and by providing the reminder work object set to the user terminal 120, the work object processor 230 may enable the user terminal 120 to visualize a related reminder work object set in a unit of the work activity map 320 in another portion of the work activity map interface 500 that displays the work activity map 320 (see a today reminder list 560 of FIG. 5).

In an exemplary embodiment, when a work execution state of the work object 350 corresponds to a state of 'new', 'doing' or 'done', in order to determine that reminder is required, the work object processor 230 may determine a reminder condition, and when a work execution state of the work object 350 corresponds to a 'determination' state, in order to determine that reminder is not required, the work object processor 230 may determine a reminder condition. For example, when a work execution state of the work object 350 corresponds to a state of 'new', 'doing', or 'done', the work object processor 230 may determine that reminder is required, and when a work execution state of the work object 350 corresponds to a 'determination' state, the work object processor 230 may determine that reminder is not required.

In an exemplary embodiment, the work object processor 230 may determine whether the difference date number to a deadline according to a work execution state of the work object 350 satisfies a specific condition to determine whether reminder is urgently required, and if reminder is urgently required, in a process of reminding to a related receiver, the work object processor 230 may provide visually emphasized display or increase an execution frequency of reminder. For example, when a work execution state of the work object 350 corresponds to a 'new' state, if the work execution state corresponds to a 'doing' state from before two days of a deadline and if the work execution state corresponds to a 'done' state from before one day of the deadline, the work object processor 230 may determine that reminder is required from after one day of the deadline.

The work object processor 230 may generate a reminder message including reminder contents and the reminder number of a reminder work object in a reminder work object set to transmit the reminder message to at least one of a work processor, a work generator, and a work reference person related to the reminder work object. Here, the work reference person is determined according to whether the work reference person participates in the chat room 340 related to the reminder work object. Here, the reminder contents may include summary information about at least one of a related work generator, work processor, work contents, work execution state, and deadline, and the reminder number represents whether the reminder corresponds to which reminder. The work object processor 230 may accumulatively count the reminder execution number on a reminder work object basis to calculate the reminder number.

More specifically, the work object processor 230 may transmit a generated reminder message to the work processor related to the reminder work object and transmit the generated reminder message even to a participant of the chat room 340 related to the work object 350. For example, a participant of the chat room 340 related to the generated reminder message includes a work processor and a work generator related to the work object 350 and may further include at least one work reference person. By together transmitting a reminder message to members participating in a related chat room, the work object processor 230 enables a work execution situation to be shared between members, thereby improving work efficiency.

In an exemplary embodiment, by transmitting a reminder message by providing with a method of adding the reminder message as a work message to a message thread of a related chat room, by providing in a form of a popup message through a popup function of a messenger installed in the user terminal 120 related to a corresponding receiver, or by providing a list including a work outline and a work object access link of a reminder work object through the today reminder list 560 of the work activity map interface 500, the work object processor 230 may perform reminder.

The work object processor 230 may calculate a response level of a work processor related to the work object 350 on a work execution state basis of the work object 350. Here, a response level represents whether the work processor changes a work execution state of the work object 350 by interacting to which reminder message. In an exemplary embodiment, the work object processor 230 may calculate a response level of the work processor on a work execution state basis based on the reminder number related to the work object 350. For example, when a work execution state of the work object 350 is changed to a 'doing' state by the work processor before transmitting a reminder message in relation to a specific work object 350 in which a work execution state corresponds to a 'new' state, the work object processor 230 may calculate a response level of the work processor in the 'new' state to 0, and as a work processor interacts a first reminder message, when a work execution state is changed, the work object processor 230 may calculate a response level to 1.

In an exemplary embodiment, the work object processor 230 may calculate an average response level of a work processor based on a response level of the work processor calculated on a work execution state basis based on the reminder number related to the work object 350. For example, by performing an interaction of total 98 times for a reminder message of all work objects 350 in which the work processor is related, the work object processor 230 changes a related work execution state, and when an average value of an entire response level calculated on a work execution state basis of all work objects 350 is 2.3, an average response level may be represented with 2.3 @ 98.

In an exemplary embodiment, the work object processor 230 may calculate an average response level on a person basis or on a team basis. The work object processor 230 may provide a calculated response level and an average response level to the user terminal 120, and thus because the user may easily determine whether which member has which response level to which another member, and whether which team has which response level to which another team, efficiency of work management can be increased, and because a rapid interaction can be induced, a teamwork can be improved.

The work object processor 230 may receive an interaction of the received work object 350 from a third member through the received work activity 330 or through the chat room 340 to update the work object 350. Here, the third member is one of members related to the work activity map 320, and may be a member different from the first member or the second member and may be the same member as the first member or the second member. More specifically, the work object processor 230 may enter the related chat room 340 through the already received work activity 330 to receive an interaction of the related work object 350 through the chat room 340, enter the related chat room 340 through the work activity map 320 to receive an interaction through the chat room 340, and update a work execution state of the work object 350 based on the received interaction. In an exemplary embodiment, the work object processor 230 may receive an interaction of a receiver through a reminder message transmitted for the work object 350 in a messenger installed in the user terminal 120 to update a work execution state of the work object 350, and for example, the work object processor 230 may receive an interaction from a third member through a work execution state change button (not shown) of the work object 350 in the today reminder list 560 of the work activity map interface 500.

Here, the work execution state represents an outline of an execution state on a processing step basis of the work object 350, and in an exemplary embodiment, the work execution state may include 'new', 'doing', 'done', and 'determination'. The 'new' state represents a newly generated work object 350 and represents the work object 350 in which an interaction of the work processor is not received or in which the work processor is not yet designated. The 'doing' state represents a state that receives an interaction of the corresponding work object 350 from the work processor and represents a situation in which the work processor processes the work object 350. The 'done' state represents a state in which the work processor completes the work object 350 and represents a state that awaits an interaction of work completion from the work generator. The 'determination' state represents a state in which the work generator determines the complete work object 350 of the work processor. For example, when the work object processor 230 receives an interaction from a member corresponding to a work processor of the work object 350 in which a work execution state corresponds to a 'new' state, the work object processor 230 may update the work execution state to a 'doing' state, which is a next execution state.

In an exemplary embodiment, the user terminal 120 may include a 'doing' button, a 'done' button, and a 'determination' button that support writing of a work related response or a work determination response on a messenger, and the work object processor 230 may receive a work interaction between the work generator or the work processor through the 'doing' button, the 'done' button, or the 'determination' button on a messenger. More specifically, the work object processor 230 may receive a work execution response by the work processor through the 'doing' button of the user terminal 120, receive a work complete response by the work processor through the 'done' button, and receive a work determination response by the work generator through the 'determination' button. Here, the work execution response means that a work processor is processing a requested work, the work complete response means that a work processor has complete a requested work, and the work determination response means that a work generator has reviewed and appraised a work complete by a work processor.

The controller 240 may control an entire operation of the work object based work activity processing apparatus 110 and control data flow between the memory unit 210, the work activity map processor 220, and the work object processor 230. In an exemplary embodiment, the controller 240 may be implemented into a Central Processing Unit (CPU) of the work object based work activity processing apparatus 110. When the new user information 310, work activity map 320, work activity 330, chat room 340, and work object 350 are generated, adjusted, deleted, and updated, the controller 240 may store, delete, update, and manage the user information 310, the work activity map 320, the work activity 330, the chat room 340, and the work object 350 at the user memory area 211, the work activity map memory area 212, the chat room memory area 213, and the work object memory area 214 corresponding thereto and read corresponding information from the memory areas 211-214 to transfer the corresponding information to at least one of the work activity map processor 220 and the work object processor 230, as needed.

Figure 4:
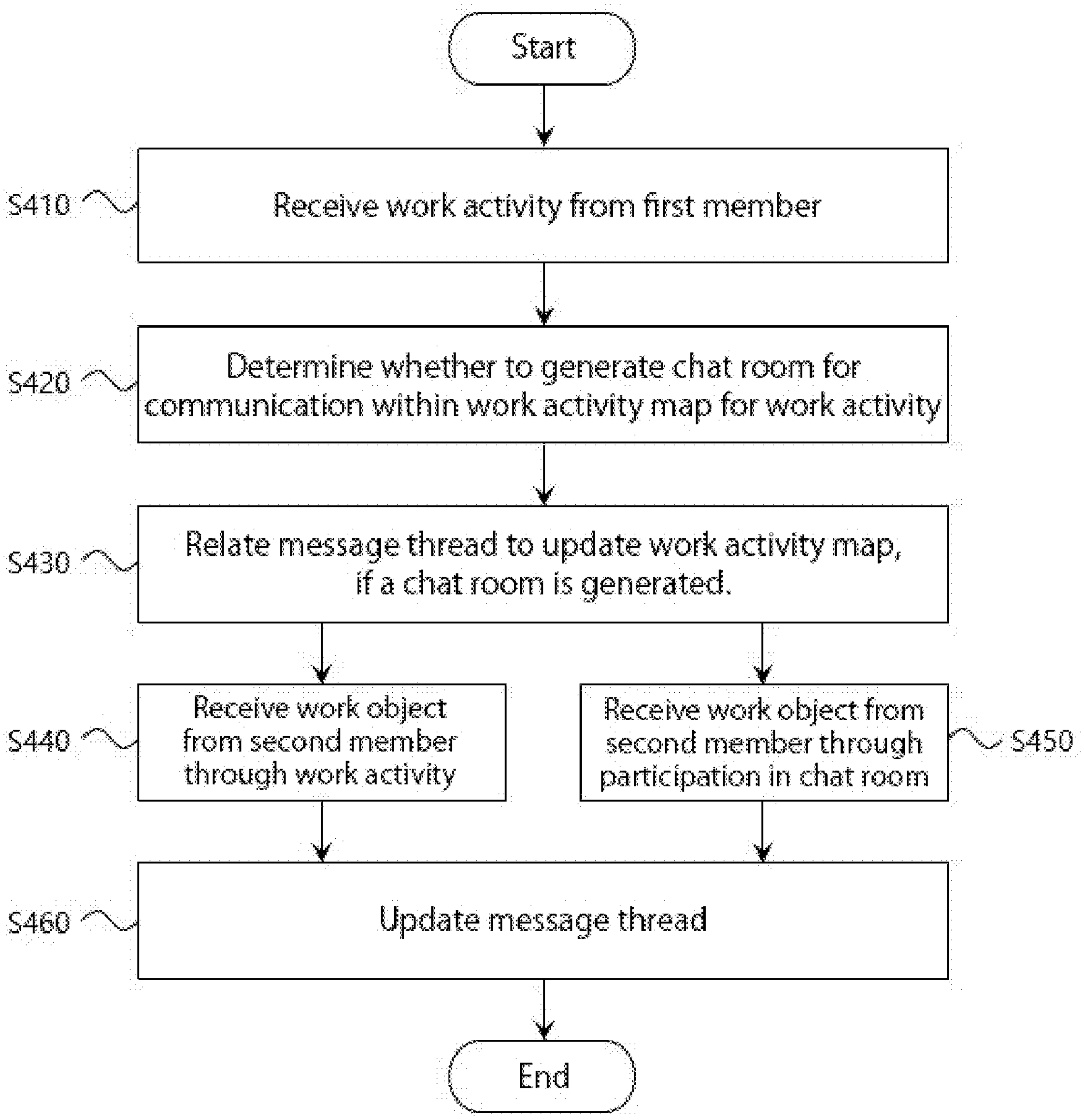
FIG. 4 is a flowchart illustrating a process in which a work object based work activity processing apparatus of FIG. 1 processes a work activity.

FIG. 4 is a diagram illustrating a process in which a work object based work activity processing apparatus of FIG. 1 processes a work activity.

When the work activity 330 is received from a first member (step S410), the work activity map processor 220 determines whether to generate the chat room 340 for communication within the work activity map 320 for the work activity 330 (step S420), and if the chat room 340 is generated, the work activity map processor 220 relates a message thread to the chat room 340 to update the work activity map 320 (step S430).

The work object processor 230 receives the work object 350 from a second member through the received work activity 330 (work activity received from the first member)

(step S440), updates a message thread (step S460) or receives the work object 350 from the second member through participation in a chat room (step S450), and updates the message thread (step S460). When the work object 350 is received through the work activity 330, the work object processor 230 may determine whether to select one of existing chat rooms 340 in which a work processor and a work generator included in the received work object 350 are participating or whether to newly generate a specific chat room 340 in which only a corresponding work processor and a work generator participate according to a user selection and add the work object 350 as a work message to an existing message thread related to the selected chat room 340 or to a new message thread generated to be related to the new chat room 340 to update the message thread.

In an exemplary embodiment, by managing the work activity 330 based on the work object 350 through the work activity map 320, the work object based work activity processing apparatus 110 may efficiently manage a work project performed by members in a company or an organization.

Figure 6:
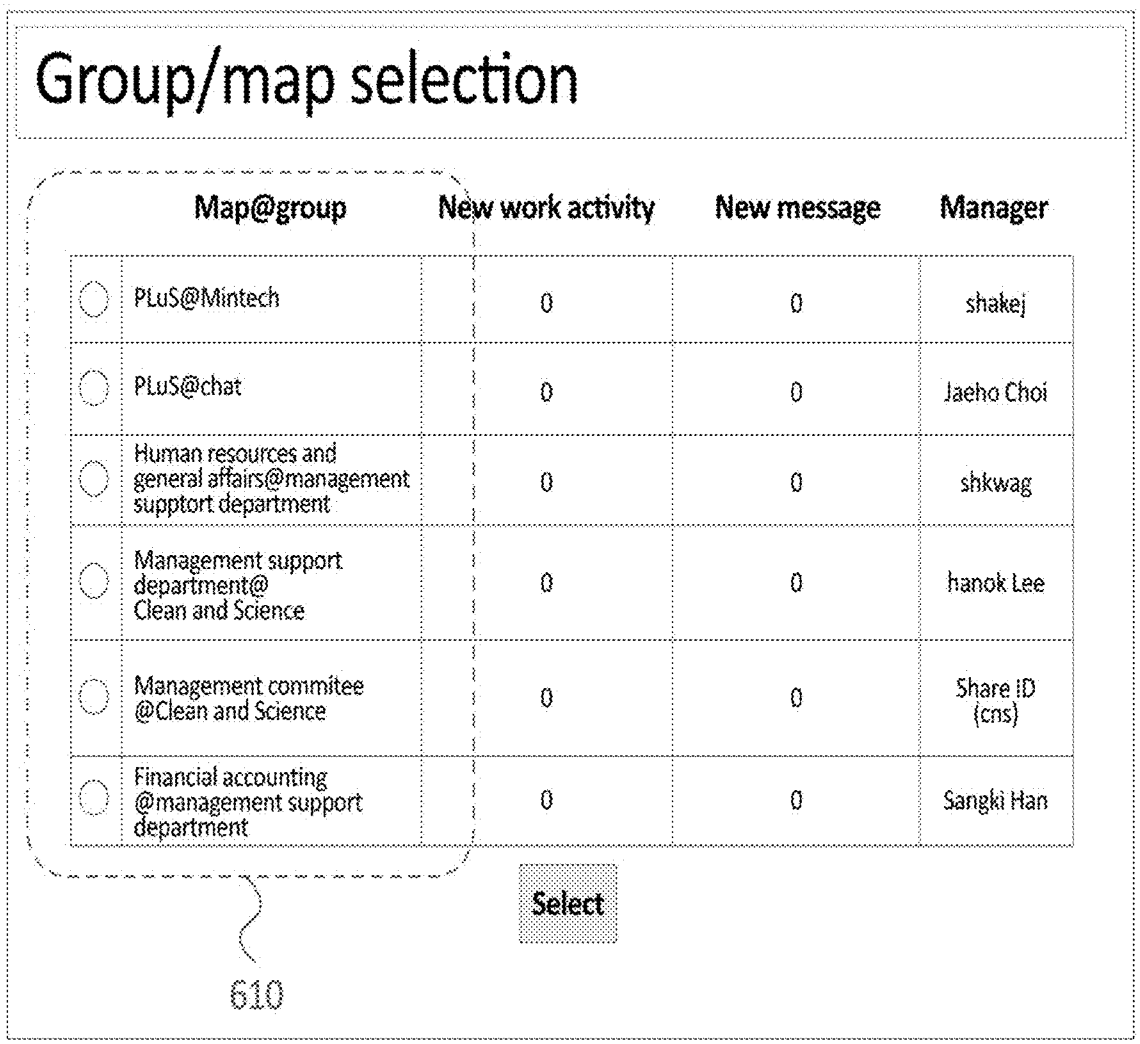
FIG. 6 is a diagram illustrating an exemplary embodiment of a process in which a work object based work activity processing apparatus of FIG. 1 provides an interface that may select a work activity map through a messenger installed in a user terminal.
Figure 7:
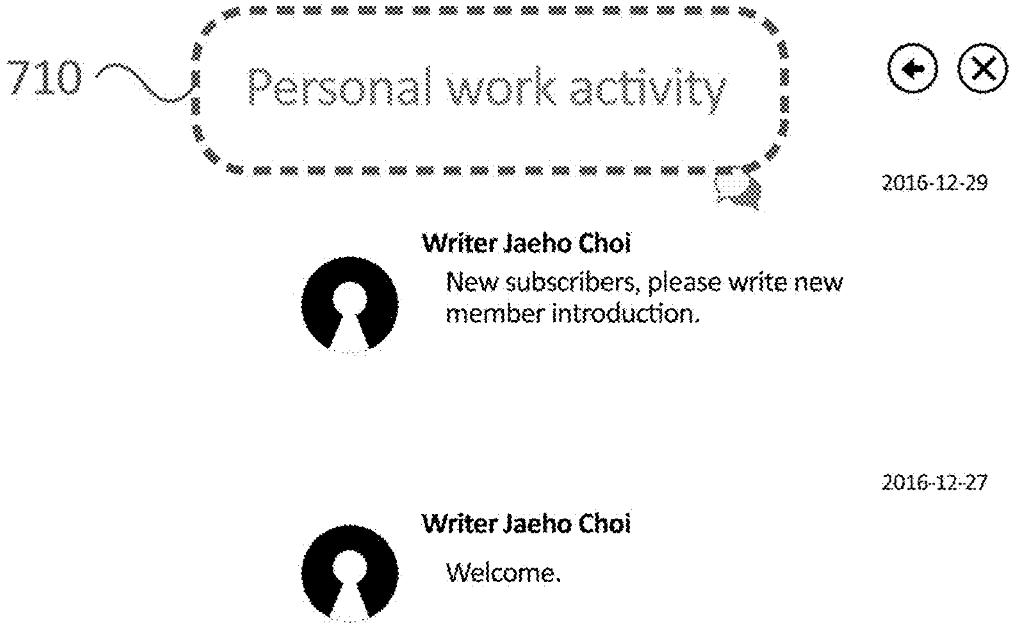
FIG. 7 is a diagram illustrating an exemplary embodiment of a process in which a work object based work activity processing apparatus of FIG. 1 provides an individual work activity through a messenger installed in a user terminal.
Figure 8:
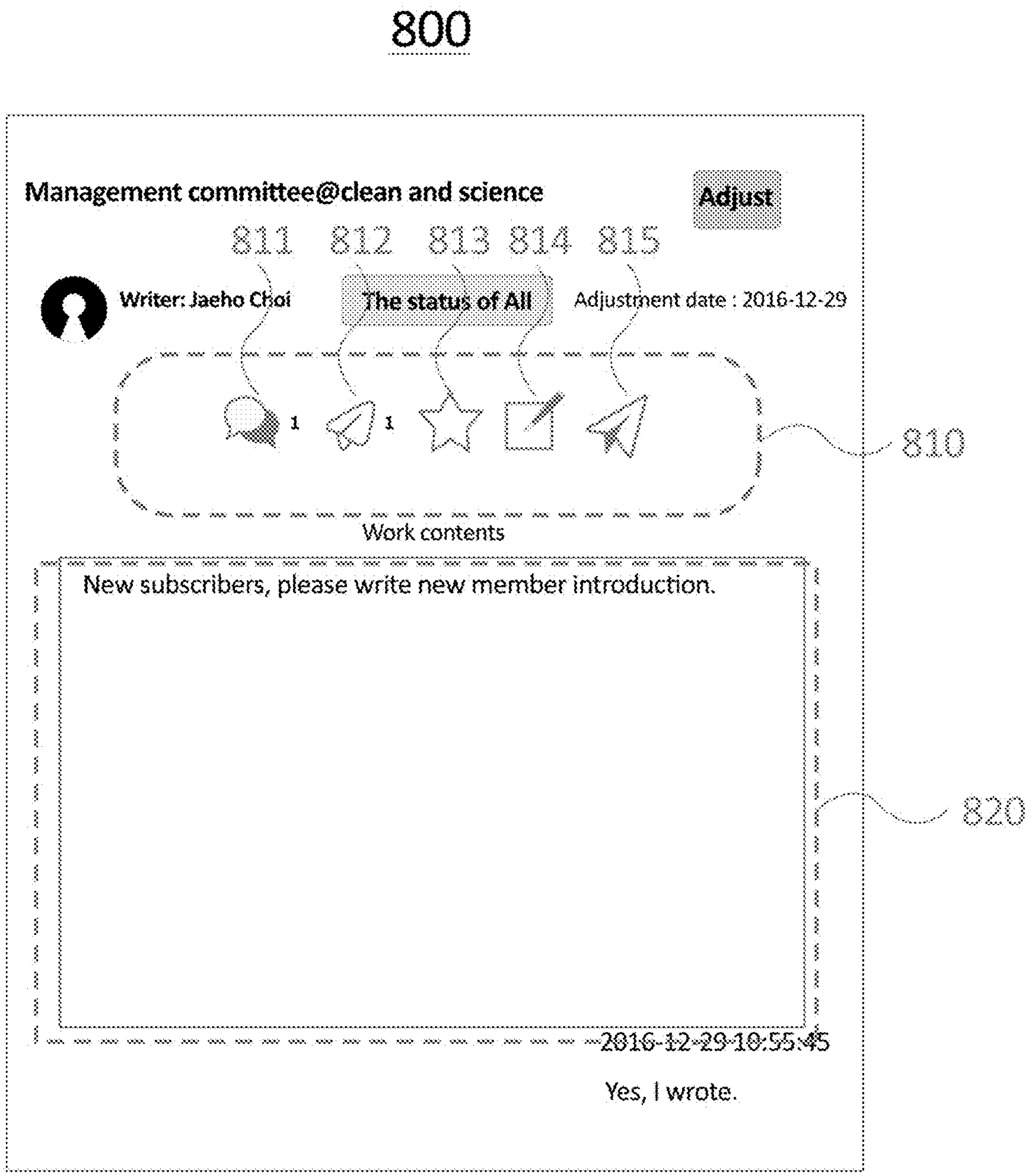
FIG. 8 is a diagram illustrating an exemplary embodiment of a process in which a work object based work activity processing apparatus of FIG. 1 provides a work activity interface through a messenger installed in a user terminal.
Figure 9:
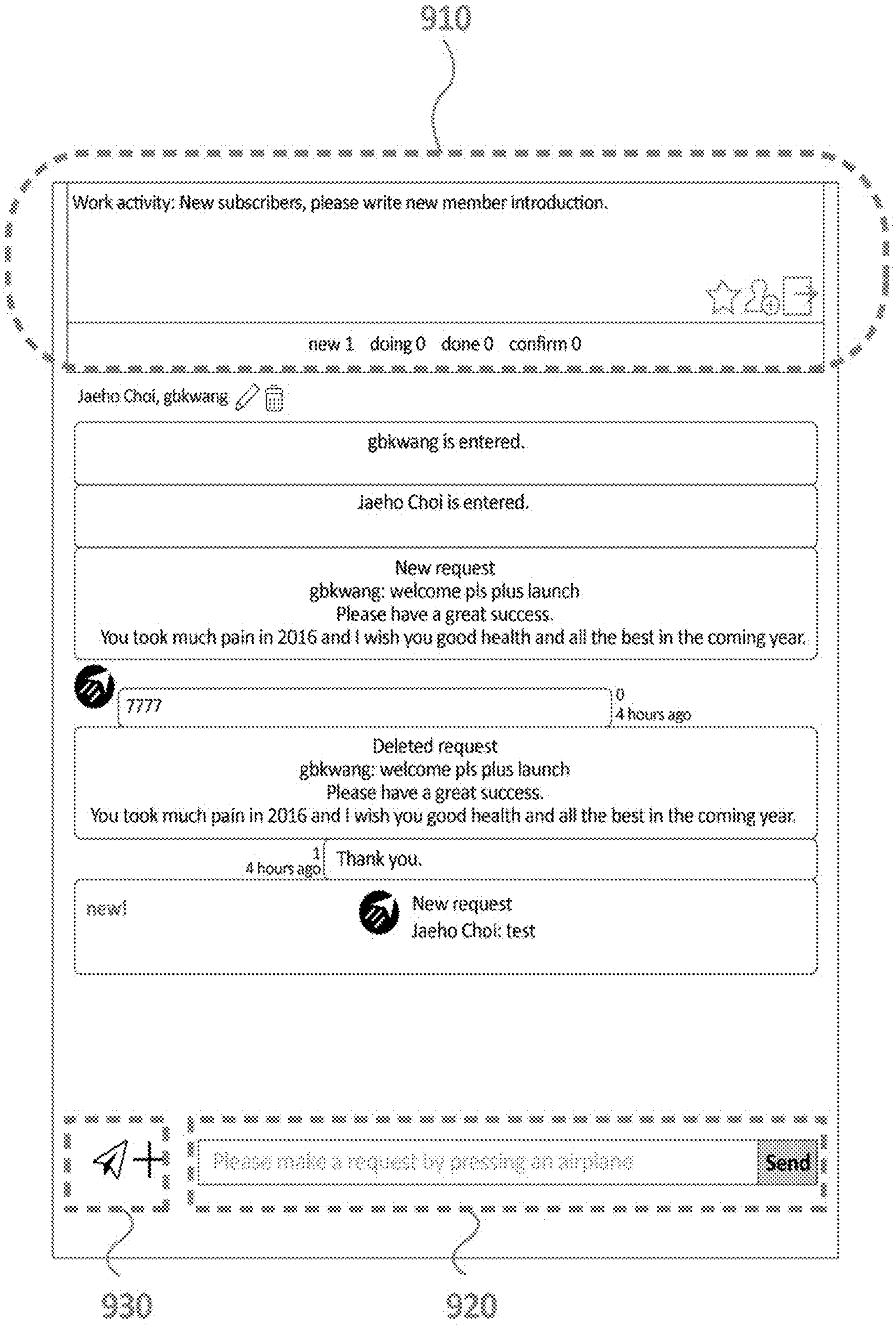
FIG. 9 is a diagram illustrating an exemplary embodiment of a process in which a work object based work activity processing apparatus of FIG. 1 provides a chat room related to a work activity through a messenger installed in a user terminal.

FIG. 5 is a diagram illustrating an exemplary embodiment of a process in which a work object based work activity processing apparatus of FIG. 1 provides a work activity map interface that visualizes a work activity map through a messenger installed in a user terminal, FIG. 6 is a diagram illustrating an exemplary embodiment of a process in which a work object based work activity processing apparatus of FIG. 1 provides an interface that may select a work activity map through a messenger installed in a user terminal, FIG. 7 is a diagram illustrating an exemplary embodiment of a process in which a work object based work activity processing apparatus of FIG. 1 provides an individual work activity through a messenger installed in a user terminal, FIG. 8 is a diagram illustrating an exemplary embodiment of a process in which a work object based work activity processing apparatus of FIG. 1 provides a work activity interface through a messenger installed in a user terminal, FIG. 9 is a diagram illustrating an exemplary embodiment of a process in which a work object based work activity processing apparatus of FIG. 1 provides a chat room related to a work activity through a messenger installed in a user terminal, and FIG. is a diagram illustrating an exemplary embodiment of a process in which a work object based work activity processing apparatus of FIG. 1 provides a today reminder list through a messenger installed in a user terminal.

Referring to FIG. 5, the work object based work activity processing apparatus 110 may provide the user information 310, the work activity map 320, the work activity 330, the chat room 340, and the work object 350 related to the user terminal 120 to provide the work activity map interface 500 that visualizes the work activity map 320 through a messenger of the user terminal 120.

The work activity map interface 500 may include a map selection button 510, a work activity filtering button 520, a work activity generation button 530, a work activity list 540, a chat room list 550, a today reminder list 560, a response level analysis button 565, a friend invitation button 570, a work activity map withdrawal button 580, a work object filtering button 590, and a first chat room generation button 595.

The work object based work activity processing apparatus 110 may receive an entrance request of one selected from the work activity map 320 and the sub-work activity map 325 related to the user terminal 120 from a user through the map selection button 510. In an exemplary embodiment, the map selection button 510 may be represented with [work activity map name @ workgroup name], and the workgroup represents a group including at least one member related to the work activity map 320. For example, the work activity map 320 of [management support department] related to members included in a workgroup of [clean and science] may be represented with [management support department @ clean and science], as shown in FIG. 5. For example, the user may select the map selection button 510 to enter a specific work activity map 320 or sub-work activity map 325 selected through a group/map selection menu 610, as shown in FIG. 6. Here, a list of the selectable work activity map 320 and sub-work activity map 325 includes a sub-work activity map 325 that may be additionally assigned to the work activity map 320 intrinsically assigned to a user related to the user terminal 120 and may include the work activity map 320 and the sub-work activity map 325 in which the user is related as a member.

When a current work activity map 320 and another work activity map 320 or the sub-work activity map 325 are selected by a user, by providing the selected work activity map 320, work activity 330, chat room 340, and work object 350 to the user terminal 120, the work object based work activity processing apparatus 110 may update and provide the work activity map interface 500 of the selected work activity map 320.

The work object based work activity processing apparatus 110 may receive a filtering request of the work activity 330 from a user through the work activity filtering button 520 related to filtering of the work activity 330 and thus by filtering at least a portion of all work activities 330 related to the current selected work activity map 320 according to a user request, the work object based work activity processing apparatus 110 may provide a filtered work activity list including a work activity outline and an entrance link. For example, when the user presses the work activity filtering button 520, by narrowing a range to 'all work activities, a work activity having a chat, a work activity having a request, and a work activity having a request before determination', the work object based work activity processing apparatus 110 may selectively determine only the filtered work activity 330, and as shown in FIG. 7, the user may filter and separately determine only the work activities 330 registered as a writer through an individual work activity 710.

The work object based work activity processing apparatus 110 may receive a new work activity 330 from a user through the work activity generation button 530. The work object based work activity processing apparatus 110 may give the authority that can generate the new work activity 330 to all members related to the work activity map 320 through the work activity map interface 500.

The work object based work activity processing apparatus 110 may provide a list including a work activity outline of the work activities 330 included in the current work activity map 320 and a corresponding work activity entrance link through the work activity list 540. In an exemplary embodiment, the work activities 330 displayed through the work activity list 540 may be aligned in most recently update order, and the user may select a specific work activity 330 in the work activity list 540 to enter a work activity interface 800 that can adjust, delete, and update the work activity 330. For example, when access to a specific work activity 330 is requested from the user through the work activity list 540 or the work activity filtering button 520, as shown in FIG. 8, the work object based work activity processing apparatus 110 may enable the user terminal 120 to provide the work activity interface 800. Referring to FIG. 8, the work activity interface 800 may include at least one of a writer, a written date, work activity contents 820, an execution date, and an attached file that visualize the work activity 330 and include a work activity related addition menu 810 including a chat room entrance link 811 that can enter the chat room 340 related to the work activity 330, a work object access link 812 that can access a related work object 350, a favorite button 813 that can set the work activity 330 to an activity having high importance, a second chat room generation button 814 that requests new generation of a related chat room, and a work object generation button 815 that requests new generation of the related work object 350.

The work object based work activity processing apparatus 110 may provide a list including a corresponding chat room entrance link and a recent message of a chat room related to the work activities 330 included in a current work activity map 320 through the chat room list 550. In an exemplary embodiment, the chat rooms 340 displayed through the chat room list 550 may be aligned in most recently update order, and the user may select a specific chat room in the chat room list 550 to immediately enter the chat room. For example, when entrance to the chat room is requested from the user through the chat room list 550 or the chat room entrance link 811 of the work activity interface 800 of a specific work activity 330, as shown in FIG. 9, the work object based work activity processing apparatus 110 may provide a chat room implemented with a message thread in which the user terminal 120 is related and include a related work activity title 910 including basic information about the work activity 330 related to an upper end portion of the chat room. The user may perform a conversation through a messenger with at least another user related to the work activity map 320 through a chat button 920 and generate the work object 350 in which a user or another user is to perform through a work object generation button 930. For example, the work generator may generate a work object 350 through the work object generation button 930 to directly instruct a work to a member participating in a chat room or a member related to the work activity map 320. When a specific user received an instruction of a work completes the work object 350, the work generator may appraise the work object 350 to provide a work appraisal point.

The work object based work activity processing apparatus 110 may provide a list including a work outline and a work object access link of a reminder work object satisfying a reminder condition among the work objects 350 related to the current selected work activity map 320 through the today reminder list 560. In an exemplary embodiment, the work object based work activity processing apparatus 110 may generate a reminder message including reminder contents and the reminder number of a reminder work object to provide the reminder message through the today reminder list 560 and receive an interaction of the reminder message from a receiver related to the reminder work object through the today reminder list 560 to update a work execution state of the work object 350.

In an exemplary embodiment, the work object based work activity processing apparatus 110 may receive a response level analysis request through a response level analysis button 565 and calculate a response level and an average response level of a reminder work object in the today reminder list 560 or all work objects 350 related to the work activity map 320 to provide the response level and the average response level to the user terminal 120. The work object based work activity processing apparatus 110 may visualize a response level calculated by the user terminal 120 through the today reminder list 560 or visualize a response level through a separate popup window to enable the user to determine whether which member has which response level to which another member or whether which team has which response level to which another team.

Figure 10:
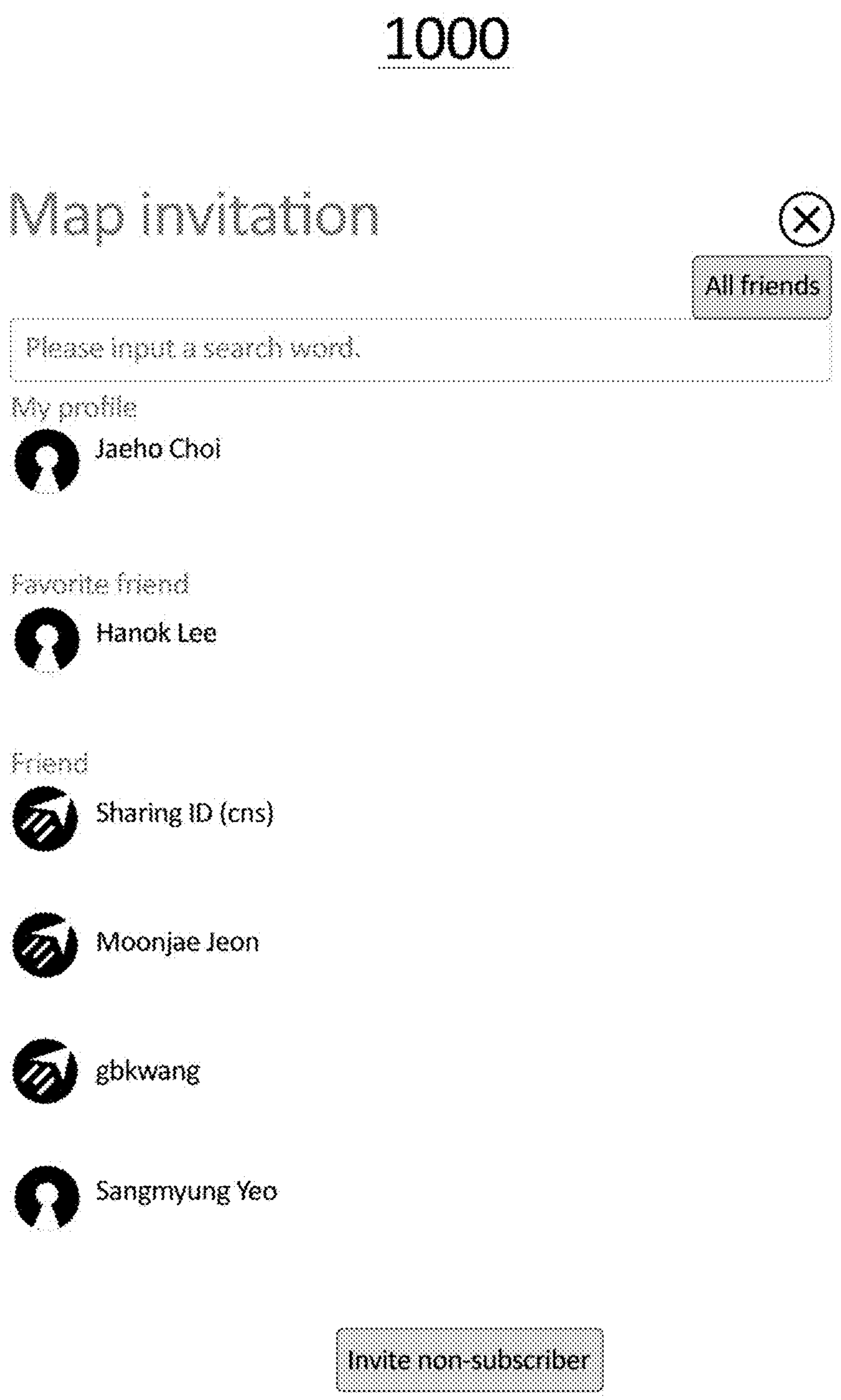
FIG. 10 is a diagram illustrating an exemplary embodiment of a process in which a work object based work activity processing apparatus of FIG. 1 provides a today reminder list through a messenger installed in a user terminal.

The work object based work activity processing apparatus 110 may receive an invitation request that invites another specific user to a current selected work activity map 320 from the user through the friend invitation button 570, and by relating the invited user as a member to the current selected work activity map 320, the work object based work activity processing apparatus 110 may enable the invited user to enter the current selected work activity map 320. For example, as shown in FIG. 10, the user may select the friend invitation button 570 to enter a friend invitation interface 1000 that can invite a specific friend to the current selected work activity map 320 and select a specific user in a friend relation or select a specific user through a search of a name or ID to invite a specific friend to the current selected work activity map 320.

The work object based work activity processing apparatus 110 may receive a withdrawal request from the current selected work activity map 320 from the user through the work activity map withdrawal button 580 and thus no longer relate the user to the current selected work activity map 320 to exclude the user from the work activity map 320. When the user corresponds to a manager of the current selected work activity map 320 or sub-work activity map 325, the work object based work activity processing apparatus 110 may enable the user terminal 120 to provide a work activity map group management button (not shown) instead of the work activity map withdrawal button 580 and receive an invitation or withdrawal request of members related to the work activity map 320 or sub-work activity map 325 through the work activity map group management button to manage related members. In an exemplary embodiment, a manager corresponds to a specific user to which the work activity map 320 is intrinsically assigned or at least one member who receives the manager authority according to a request of the specific user. The work object based work activity processing apparatus 110 may receive a filtering request of the work object 350 from the user through the work object filtering button 590 related to filtering of the work object 350 and thus may filter according to a user request of at least a portion of all work objects 350 related to the current selected work activity map 320 to provide a filtered work object list including a related chat room entrance link. For example, when the user presses the work object filtering button 590, by narrowing a range to the chat room 340 having 'all requests, my request, a received request, and a referred request', the work object based work activity processing apparatus 110 may selectively determine only a filtered chat room list.

The work object based work activity processing apparatus 110 may receive a generation request of the chat room 340 related to the work activity map 320 from a related member through the first chat room generation button 595 and generate a chat room 340 related to the work activity map 320 and not related to a specific work activity 330 included in the work activity map 320 to relate members received a request as a participant to the chat room 340.

Although exemplary embodiments of the present disclosure have been described in detail hereinabove, it should be clearly understood that many variations and modifications of the basic inventive concepts herein described, which may appear to those skilled in the art, will still fall within the spirit and scope of the exemplary embodiments of the present disclosure as defined in the appended claims.

Advantages

Disclosed technology can have the following effects. However, it does not mean that a specific exemplary embodiment should include the entire following effects or should include only the following effects, and it should not be understood that the scope of disclosed technology is limited thereto.

An apparatus and method for processing a work activity according to an exemplary embodiment of the present invention can efficiently process a work activity through a work activity map.

An apparatus and method for processing a work activity according to an exemplary embodiment of the present invention can induce a rapid interaction to improve a team-work.

What is claimed is:

1. A work activity processing apparatus based on a work object, comprising:

a memory unit comprising, a user memory area configured to store user information related to the work activity processing apparatus, a work activity map memory area related to a work activity map related to at least one member and containing at least one work activity, a work object memory area configured to store a work object associated with a chat room, and a chat room memory area related to the work activity map and related to a chat room implemented through a message thread of an internet messenger installed on a user terminal, wherein the work activity map memory area is accessible through the user information stored in the user memory area, and wherein the work object memory area is accessible through the chat room stored in the chat room memory area, such that the user memory area, the work activity map memory area, the chat room memory area, and the work object memory area are interconnected through derived associations; and a circuitry configured to receive a work activity in response to an operation on a work activity creation button of a work activity map interface that visualizes the work activity map in the internet messenger, generate, based on receiving a chat room creation request from a first member related to the work activity, the chat room associated with the work activity including a link to enter the chat room, the chat room creation request being received in response to an operation being performed on a chat room creation button of the work activity map interface, wherein generating the chat room comprises relating the chat room to the work activity in the chat room memory area and storing the link in the work activity map memory area in association with the work activity, such that the link is accessible through the work activity as displayed in the work activity map interface, create, in the chat room and in response to the first member participating in the chat room, a work object comprising a work generator, a work processor, and work contents, the first member participating in the chat room in response to an operation being performed on a work object creation button of the work activity map interface, wherein the work object is stored in the work object memory area and is associated with the chat room through the chat room memory area, and add the work object as a work message to the message thread related to the chat room to update the message thread and then update the work activity map to include the work activity including the link and the work message, wherein the work activity including the link is displayed in the work activity map visualized in the work activity map interface to enable a second member to enter the chat room through the link embedded within the work activity in the work activity map interface, wherein updating the work activity map comprises updating the work activity map memory area such that the work activity stored in the work activity map memory area is associated with both the link to the chat room and the work message, and the work activity including the link and the work message is accessible through the work activity map interface, and wherein the circuitry is further configured to read the user information from the user memory area to identify the work activity map associated with the user in the work activity map memory area, read work activity map information from the work activity map memory area to identify the chat room associated with the work activity map in the chat room memory area, and read chat room information from the chat room memory area to identify the work object associated with the chat room in the work object memory area, thereby deriving navigational links between the user memory area, the work activity map memory area, the chat room memory area, and the work object memory area such that a user associated with the user memory area is enabled to access the work object stored in the work object memory area through the derived navigational links.

2. The work activity processing apparatus of claim 1, wherein the circuitry is further configured to provide a work activity map link that can enter each of work activity maps intrinsically assigned to each of members related to a work activity map through the work activity map.

3. The work activity processing apparatus of claim 1, wherein the circuitry is further configured to in response to receiving the chat room creation request from the first member related to the work activity, update a work activity object stored in the work activity map memory area to include the link to enter the chat room related to the work activity, such that the link is reflected in the work activity map interface upon the update, and in response to receiving a work activity without a chat room generation request, update the work activity map based on the work activity.

4. The work activity processing apparatus of claim 3, wherein the circuitry is further configured to align at least one work activity or work activity object included in the work activity map in most recently update order to display the at least one work activity or work activity object at a specific portion of the work activity map.

5. The work activity processing apparatus of claim 1, wherein the circuitry is further configured to receive a second work object from a second member through the work activity already received from the first member, wherein the second work object comprises a work generator, a work processor, and work contents and is stored in the work object memory area in association with the chat room through the chat room memory area, and add, as a second work message, the second work object to the message thread related to the chat room in which a work processor and a work generator included in the received second work object are participating.

6. The work activity processing apparatus of claim 5, wherein the circuitry is further configured to enable the second member to enter the chat room through the received work activity or enable the second member to enter the chat room through the link to the chat room provided to the work activity map.

7. The work activity processing apparatus of claim 4, wherein the circuitry is further configured to generate a reminder work object set satisfying a reminder condition among the work objects to display the reminder work object set at another specific portion of the work activity map.

8. The work activity processing apparatus of claim 7, wherein the circuitry is further configured to generate a reminder message comprising reminder contents and a reminder number of reminder work object at the reminder work object set to transmit the reminder message to at least one of a work processor and a work generator related to the reminder work object and a work reference person determined according to whether the work reference person participates in a chat room related to the reminder work object.

9. The work activity processing apparatus of claim 1, wherein the circuitry is further configured to calculate a response level of the work processor related to the work object on an execution state basis of the work object.

10. The work activity processing apparatus of claim 1, wherein the circuitry is further configured to provide a reminder message by adding the reminder message as a work message to a message thread of a related chat room.

11. The work activity processing apparatus of claim 1, wherein the circuitry is further configured to in response to receiving a filtering request of the work object, filter at least a portion of all work objects related to the work activity map to provide a filtered work object list comprising a related chat room entrance link to a related chat room.

12. The work activity processing apparatus of claim 1, wherein the circuitry is further configured to determine whether a difference date number to a deadline according to a work execution state of the work object satisfies a specific condition to determine whether reminder is urgently required, and when the specific condition is satisfied and reminder is urgently required, provide visually emphasized display or increase an execution frequency of the reminder in a process of reminding to a related receiver.

13. The work activity processing apparatus of claim 12, wherein the circuitry is further configured to update the work execution state of the work object by causing the work processor to perform a feedback comprising an interaction of a work execution response and a work completion response regarding the work object on the chat room, and visualize the work activity map after a work activity status is updated.

* * * * *